Figure 1:
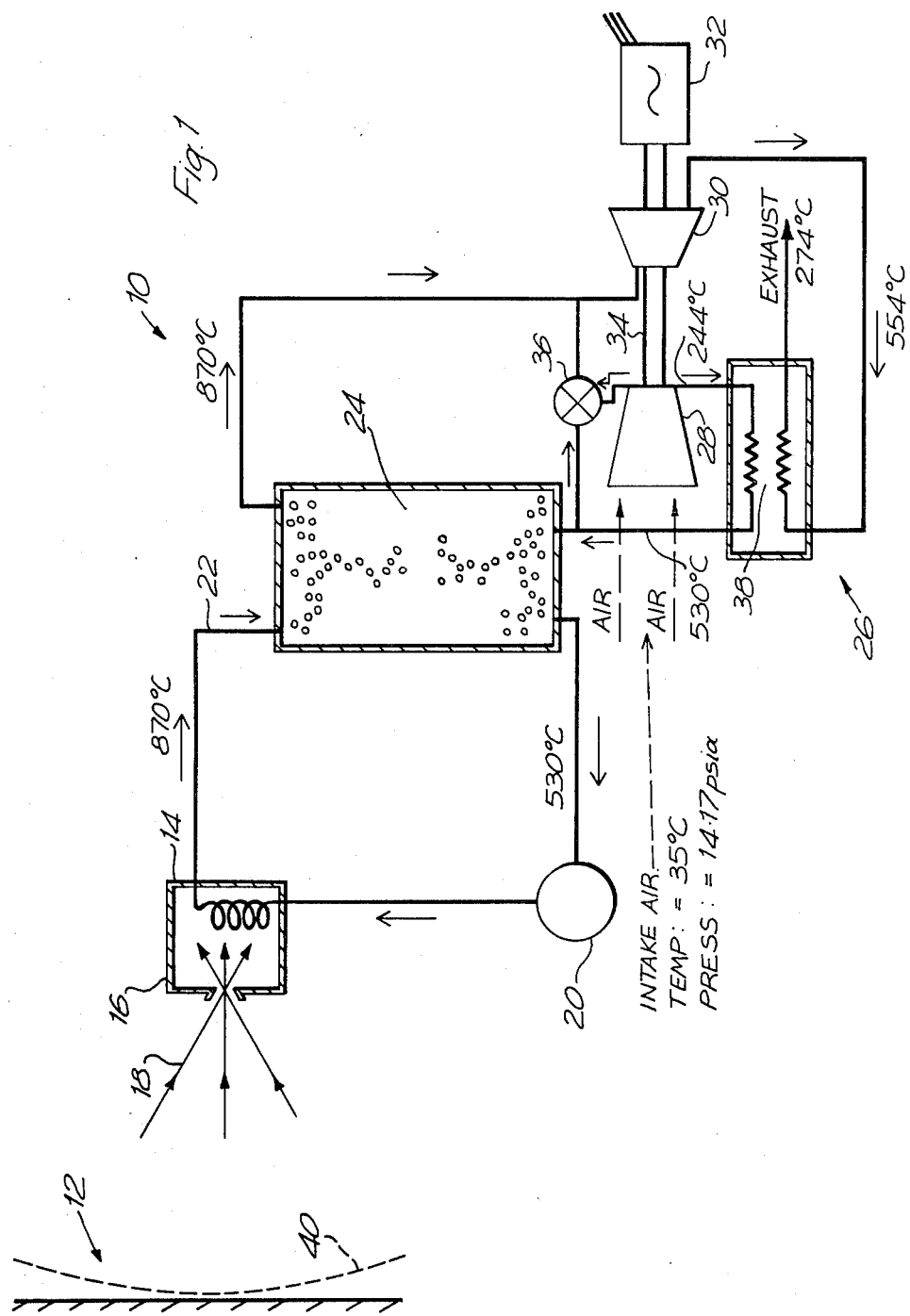

United States Patent [19]

Jubb et al.

[11] 4,222,369

[45] Sep. 16, 1980

[54] SOLAR RADIANT ENERGY HEAT EXCHANGER

[75] Inventors: Albert Jubb; Eric W. Stansbury, both of Kenilworth, England

[73] Assignee: Rolls-Royce Limited, London, England

[21] Appl. No.: 951,254

[22] Filed: Oct. 13, 1978

[30] Foreign Application Priority Data

Oct. 18, 1977 [GB] United Kingdom ............... 43237/77

[51] Int. Cl.³ ................................................. F24J 3/02
[52] U.S. Cl. .................................... 126/438; 126/439; 126/448
[58] Field of Search ............... 126/448, 438, 439, 446, 126/450, 419, 442, 441; 350/288, 293, 292, 299; 60/641

[56] References Cited

U.S. PATENT DOCUMENTS

| | | |
|---|---|---|
| 4,044,753 | 8/1977 | Fletcher et al. ..................... 126/442 |
| 4,132,222 | 1/1977 | Roark ................................... 126/438 |

*Primary Examiner*—James C. Yeung
*Attorney, Agent, or Firm*—Cushman, Darby & Cushman

[57] ABSTRACT

A radiant energy heat exchanger for use in a solar energy power plant comprises one or more banks of heat exchange ducts, the or each bank of ducts having an inlet and an outlet manifold to receive and discharge respectively the medium to be heated, the ducts all being curved along their length between the inlet and outlet manifolds so that the amount of radiant energy falling on the ducts per unit area of duct decreases between the inlet and outlet manifolds at such a rate that the duct temperature is substantially constant between the manifolds while the temperature of the medium being heated increases, the radiant energy falling on the ducts being substantially unidirectional.

1 Claim, 3 Drawing Figures

SOLAR RADIANT ENERGY HEAT EXCHANGER

This invention relates to radiant energy heat exchangers more particularly for use in a solar energy power plant in which solar energy is used indirectly to heat the working medium of a gas turbine engine. The present invention provides a radiant energy heat exchanger comprising at least one bank of heat exchange ducts, the or each bank having an inlet and outlet manifold to receive and discharge respectively the medium to be heated, the ducts all being curved along their length between the inlet and outlet maniifolds so that the amount of radiant energy falling on the ducts per unit area of duct decreases between the inlet and outlet manifolds at such a rate that the duct temperature is substantially constant between the said manifolds whilst the temperature of the medium being heated increases within the ducts, the radiant energy falling on the ducts being substantially undirectional.

A metal or ceramic reflector may be located adjacent that face of the or each bank of ducts opposite to that face on which the radiant energy falls directly. The object of the invention is to attempt to ensure that the duct temperature remains substantially constant along the duct length thereby avoiding or minimising the effects of a temperature gradient.

The radient energy heat exchanger according to the present invention may be used in a solar energy power plant which includes a mirror field to reflect radiant energy onto one or more radiant energy heat exchangers as disclosed in this specification, a heat transfer medium such as air being pumped through the said heat exchangers in a closed loop, the closed loop including a relatively large capacity heat store and a gas turbine engine driving a load which extracts heat energy from the heat store to heat the working medium of the gas turbine.

Figure 2:
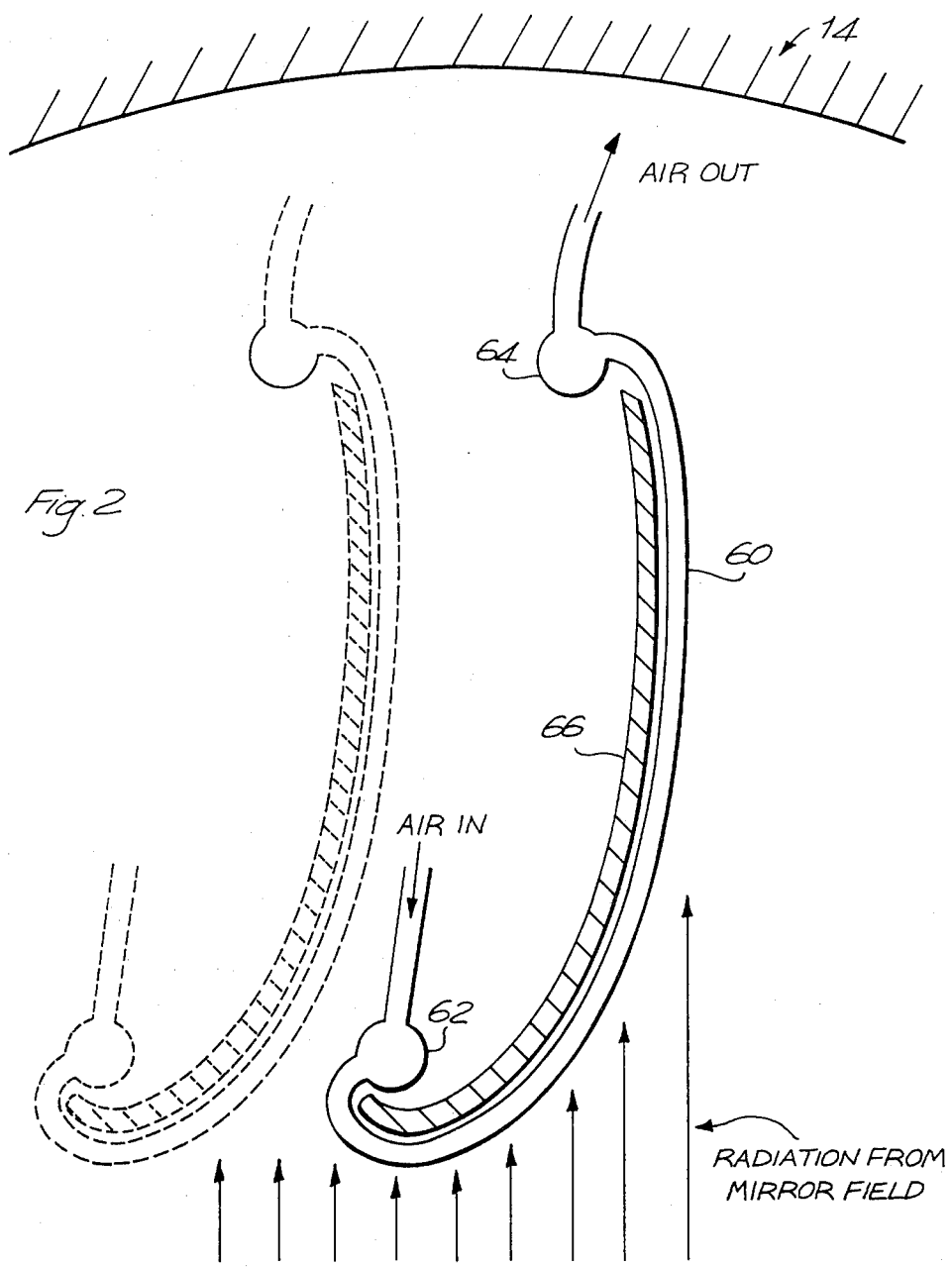
Figure 3:
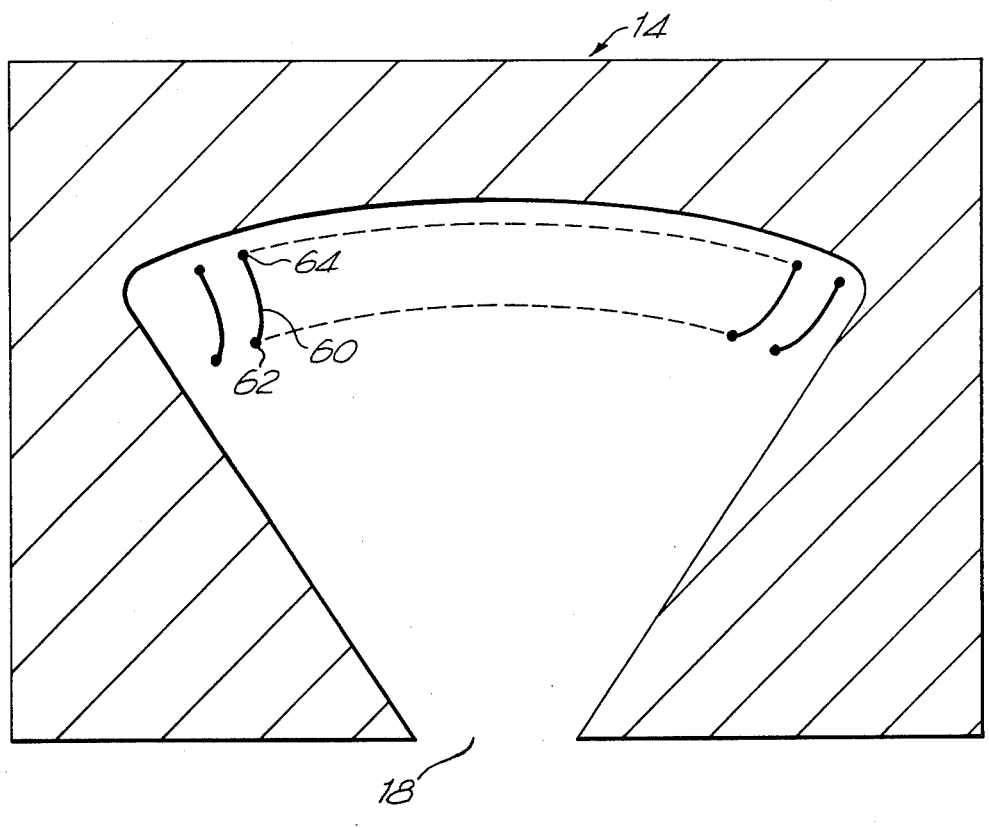

The present invention will now be particularly described with reference to the accompanying drawings in which:

FIG. 1 shows a diagrammatic layout of a solar energy power plant using one or more radiant energy heat exchangers according to the present invention, FIG. 2 shows in more detail one form of radiant energy heat exchanger according to the present invention, and FIG. 3 shows a number of radiant energy heat exchangers mounted in a heat receiver of the solar energy power plant shown in FIG. 1.

Referring to FIG. 1, a solar energy power plant 10 comprises a mirror field 12, the rays from which are directed onto four interconnected heat receivers and exchangers 14 which are enclosed within an insulated container 16 having four apertures 18 for the respective heat receivers. A pump or fan 20 circulates a heat exchange medium, e.g. air through a loop 22 which includes the heat receivers 14 and a large capacity pressurised heat store 24.

The heat store 24 supplies the heat energy for a gas turbine power plant 26 which comprises a compressor 28, turbine 30 and alternator 32 all mounted on a common shaft 34. A by-pass valve 36 is provided in the compressor delivery line to control the proportion of compressor delivery air flowing through the heat store 24 and a heat exchanger 38 using the turbine exhaust gas used to preheat the compressor delivery air before it passes into the heat store 24.

The mirror field 12 consists of six hundred hexagonal mirrors 40, each mirror being built up from fifty four equilateral triangles, each heat receiver 14 dealing with a quarter of the mirror field. The mirrors 40 are movably supported on a space frame (not shown) and have control means (not shown) so that the mirrors can continuously focus the suns rays into the respective apertures 18 of the heat receivers as the sun traverses the sky. The heat receivers 14 comprise a bank or banks of tubes 60 for the throughflow of heat transfer medium with associated inlet and outlet manifolds 62, 64 respectively. At the back of each bank is a radiation reflector 66 which may be a ceramic material or a nickel alloy, such as Nimonic 105. The tubes 60 are shaped over their length to give a curvature which results in the radiant energy falling on the tubes per unit area decreasing along the length of the tubes at a rate which results in the tube temperature remaining substantially constant whilst that of the heat transfer medium increases. Thus, the radiant energy falling on the tubes 60 is greates at the entry to the tubes and decreases towards the exit from the tubes. It is important that the radiant energy falling on the tubes is substantially unidirectional and that all reflecting surfaces in the container 16, including the heat exchange surfaces of the heat receivers 14, e.g. the tubes 60 have an emissivity which is as near to unity as is practicable.

In FIG. 3, a munber of banks of tubes 60 are mounted in the heat receiver 14 so that the radiant energy falling on the tubes is substantially unidirectional and the aperture 18 is arranged so that the angle of direct radiation is small, i.e. substantially parallel.

In the present example, the heat exchange medium is air which is required to be heated from a temperature of 530° C. at the inlet manifold to 870° C. at the outlet manifold and the radiant energy e.g. heat input to the air is arranged by designing the shape of the tubes 60 so that the radiant energy falls on the tubes at this varying rate. The tube temperature will then remain substantially constant at 900° C.

We claim:

1. A solar radiant energy heat exchanger comprising at least one bank of heat exchanger ducts, said bank having inlet and outlet manifolds to receive and discharge respectively a heat exchange medium to be heated, said ducts all being curved along their length between the inlet and outlet manifolds, said ducts having a curvature over their entire axial length such that the amount of radiant energy falling on the ducts per unit area of duct decreases between the inlet and outlet manifolds at such a rate that the duct temperature is substantially constant between said manifolds while the temperature of the medium being heated increases within the ducts, a heat reflector having a substantially same length as the bank of ducts, said heat reflector being mounted closely adjacent and coaxially parallel with respect to a face of said bank of ducts opposite to a face on which the radiant energy falls directly, and means for unidirecting radiant energy onto said ducts.

* * * * *